United States Patent
Parekh et al.

(10) Patent No.: US 7,717,405 B2
(45) Date of Patent: May 18, 2010

(54) HOLLOW FIBER MEMBRANE CONTACT APPARATUS AND PROCESS

(75) Inventors: Bipin S. Parekh, Chelmsford, MA (US); Rajnikant B. Patel, Tewksbury, MA (US); Kwok-Shun Cheng, Nashua, NH (US)

(73) Assignee: Entegris, Inc., Billerica, MA (US)

( * ) Notice: Subject to any disclaimer, the term of this patent is extended or adjusted under 35 U.S.C. 154(b) by 0 days.

(21) Appl. No.: 12/050,247

(22) Filed: Mar. 18, 2008

(65) Prior Publication Data

US 2008/0156191 A1 Jul. 3, 2008

Related U.S. Application Data

(63) Continuation of application No. 10/508,059, filed as application No. PCT/US03/06928 on Mar. 6, 2003, now abandoned.

(60) Provisional application No. 60/366,857, filed on Mar. 19, 2002, provisional application No. 60/397,462, filed on Jul. 19, 2002.

(51) Int. Cl.
*B01F 3/04* (2006.01)
(52) U.S. Cl. .................. 261/104; 210/321.81
(58) Field of Classification Search ............ 261/100, 261/101, 104, DIG. 42; 210/321.79, 321.8, 210/321.81, 321.88, 321.89, 321.9, 500.23; 95/45, 46; 96/6, 8, 10, 14

See application file for complete search history.

(56) References Cited

U.S. PATENT DOCUMENTS

| | | | |
|---|---|---|---|
| 3,708,071 A | 1/1973 | Crowley | |
| 5,266,639 A | 11/1993 | Chapman, Jr. et al. | |
| 5,328,610 A | 7/1994 | Rogut | |
| 5,463,006 A | 10/1995 | Abusleme et al. | |
| 5,464,480 A | 11/1995 | Matthews | |
| 5,670,094 A | 9/1997 | Sasaki et al. | |
| 5,749,941 A | 5/1998 | Jensen et al. | |

(Continued)

FOREIGN PATENT DOCUMENTS

CN 1191767 9/1997

(Continued)

OTHER PUBLICATIONS

Ohmi, et al., *J. Electrochem. Soc.*, Mar. 1993, vol. 140 (3). 804-810.

(Continued)

*Primary Examiner*—Scott Bushey
(74) *Attorney, Agent, or Firm*—John E. Pillion; Timothy J. King; Ernest V. Linek

(57) ABSTRACT

Disclosed is a shell side contactor which can be used to form ozonated water. The contactor includes a shell and a plurality of porous perfluoroalkoxy resin thermoplastic hollow fibers that are potted at each end of the shell. The perfluoroalkoxy resin hollow fibers can be unskinned, skinned on their inner surface, or skinned on their outer surfaces. The contactor is provided with a spacer that spreads the hollow fibers adjacent an inlet to the shell, thereby permitting liquid flow at desirably high flow rates with acceptable pressure drop through the shell. The mass transfer efficiency of the contactor can be enhanced by jetting water into the fiber bundle and introducing gaps into the bundle.

19 Claims, 15 Drawing Sheets

U.S. PATENT DOCUMENTS

| | | | |
|---|---|---|---|
| 5,902,747 A | 5/1999 | Nemser et al. | |
| 6,113,782 A | 9/2000 | Leonard | |
| 6,582,496 B1 | 6/2003 | Cheng et al. | |
| 6,663,745 B1 | 12/2003 | Cheng et al. | |
| 6,802,972 B1 | 10/2004 | Cheng et al. | |
| 6,802,973 B2 | 10/2004 | Cheng et al. | |
| 6,805,731 B2 | 10/2004 | Cheng et al. | |
| 6,921,482 B1 | 7/2005 | Cheng et al. | |
| 6,977,043 B2 | 12/2005 | Cheng et al. | |
| 2004/0094466 A1 | 5/2004 | Cheng et al. | |
| 2004/0251010 A1 | 12/2004 | Doh et al. | |
| 2007/0089489 A1* | 4/2007 | Lewnard et al. | 73/38 |

FOREIGN PATENT DOCUMENTS

| | | | |
|---|---|---|---|
| JP | 58-095202 U | 6/1983 | |
| JP | 62-144707 | 6/1987 | |
| JP | 63-19961 | 11/1994 | |
| JP | 10305218 | 11/1998 | |
| JP | 2000-246064 | 9/2000 | |
| WO | 20004484 | 8/2000 | |
| WO | 200044479 | 8/2000 | |
| WO | 200044480 | 8/2000 | |
| WO | 200044482 | 8/2000 | |
| WO | 200139869 | 6/2001 | |

OTHER PUBLICATIONS

Roth, et al., *Ind. Eng. Chem. Fundam.*, 1981, 20, 137-140.

* cited by examiner

HOLLOW FIBER MEMBRANE CONTACT APPARATUS AND PROCESS

CROSS REFERENCE TO RELATED APPLICATIONS

This Application is a continuation of application Ser. No. 10/508,059 filed 17 Sep. 2004, now abandoned. Application Ser. No. 10/508,059 was a Section 371(c) filing of PCT Application No. PCT/US03/06928, filed 6 Mar. 2003, which designated the United States and was published in the English language as PCT Publication No. WO 03/080228 on 2 Oct. 2003. The PCT Application claimed priority from U.S. Provisional Patent Application Ser. Nos. 60/366,857, filed 19 Mar. 2002 and 60/397,462, filed 19 Jul. 2002.

FIELD OF THE INVENTION

This invention relates to a hollow fiber membrane contactor for phase contact applications. The contactor is made from perfluorinated alkoxy polymeric materials, has a high packing density providing high useful contacting area, and the ability to operate with liquids of low surface tension.

BACKGROUND OF THE INVENTION

Liquid-gas contactors are used to transfer one or more soluble substances from one phase to another. Examples of conventional contactors are packed towers, plate columns and wetted wall columns. In these systems, gas absorption of one or more components from a gas stream is accomplished by dispersing the gas as bubbles in packed towers and plate columns in a countercurrent flow to a liquid stream. Absorption efficiency is controlled apart from solubility considerations by the relative rate of the flows and the effective surface area of the gas flow bubbles. In wetted wall contactors the gas stream flows past a downward flow of liquid on the inside wall of a vertical tube. Gas stripping is used to transfer a gas dissolved in liquid into a gas stream. Similar contactors are used for gas stripping.

Conventional contactors have several deficiencies. Primary among these is the fact that the individual gas and liquid flows cannot be varied independently over wide ranges. Tray columns are prone to such problems as weeping at low gas flows and flooding at high liquid flows. Packed towers can flood at high flow rates. The use of low liquid flow rates in a packed tower can lead to channeling and reduced effective surface area Excessive frothing or foam formation can lead to process inefficiency. Wetted wall contactors have inherently low mass transfer coefficients, and can flood at high gas flow rates. The development of membrane contactors has overcome these deficiencies.

Membrane contactors are devices through which two fluid phases flow separated by a membrane permeable to the gas being transferred. If a microporous membrane is being used, the preferred method relies on the non-wetting characteristic of the membrane material and the pore size to prevent liquid from intruding into the pores and filling them. Gas transfer then occurs through the gas filled pores to or from the liquid, depending on whether the process is absorption or stripping. If a non-porous membrane is used, gas transfer is controlled by the diffusion rate in the non-porous layer of the membrane. While other membrane geometries are available for this use, hollow fiber membranes are ideally suited as contactors.

A hollow fiber porous membrane is a tubular filament comprising an outer diameter, an inner diameter, with a porous wall thickness between them. The inner diameter defines the hollow portion of the fiber and is used to carry one of the fluids. For what is termed tube side contacting, the liquid phase flows through the hollow portion, sometimes called the lumen, and is maintained separate from the gas phase, which surrounds the fiber. In shell side contacting, the liquid phase surrounds the outer diameter and surface of the fibers and the gas phase flows through the lumen.

The outer or inner surface of a hollow fiber membrane can be skinned or unskinned. A skin is a thin dense surface layer integral with the substructure of the membrane. In skinned membranes, the major portion of resistance to flow through the membrane resides in the thin skin. The surface skin may contain pores leading to the continuous porous structure of the substructure, or may be a non-porous integral film-like surface. In porous skinned membranes, permeation occurs primarily by connective flow through the pores. Asymmetric refers to the uniformity of the pores size across the thickness of the membrane; for hollow fibers, this is the porous wall of the fiber. Asymmetric membranes have a structure in which the pore size is a function of location through the cross-section, typically, gradually increasing in size in traversing from one surface to the opposing surface. Another manner of defining asymmetry is the ratio of pore sizes on one surface to those on the opposite surface.

Manufacturers produce membranes from a variety of materials, the most general class being synthetic polymers. An important class of synthetic polymers is thermoplastic polymers, which can be flowed and molded when heated and recover their original solid properties when cooled. As the conditions of the application to which the membrane is being used become more severe, the materials that can be used become limited. For example, the organic solvent-based solutions used for wafer coating in the microelectronics industry will dissolve or swell and weaken most common polymeric membranes. The high temperature stripping baths in the same industry consist of highly acid and oxidative compounds, which will destroy membranes made of common polymers. Perfluorinated thermoplastic polymers such as poly(tetrafluoroethylene-co-perfluoro(alkylvinylether)) (poly (PTFE-CO-PFVAE)) or poly(tetrafluoro-ethylene-co-hexafluoropropylene) (FEP) are not adversely affected by severe conditions of use, so that membranes made from these polymers would have a decided advantage over ultrafiltration membranes made from less chemically and thermally stable polymers. These thermoplastic polymers have advantages over poly(tetrafluoroethylene) (PTFE), which is not a thermoplastic, in that they can be molded or shaped in standard type processes, such as extrusion. Perfluorinated thermoplastic hollow fiber membranes can be produced at smaller diameters than possible with PTFE. Fibers with smaller diameters, for example, in the range of about 350 micron outer diameter to about 1450 micron outer diameter, can be fabricated into contactors having high membrane surface area to contactor volume ratios. This attribute is useful for producing compact equipment, which are useful in applications where space is at a premium, such as in semiconductor manufacturing plants.

Being chemically inert, the Poly(PTFE-CO-PFVAE) and FEP polymers are difficult to form into membranes using typical solution casting methods as they are difficult to dissolve in the normal solvents. They can be made into membranes using the Thermally Induced Phase Separation (TIPS) process. In one example of the TIPS process a polymer and organic liquid are mixed and heated in an extruder to a temperature at which the polymer dissolves. A membrane is shaped by extrusion through an extrusion die, and the extruded membrane is cooled to form a gel. During cooling the polymer solution temperature is reduced to below the upper critical solution temperature. This is the temperature at or below which two phases form from the homogeneous heated solution, one phase primarily polymer, the other primarily solvent. If done properly, the solvent rich phase forms a continuous interconnecting porosity. The solvent rich phase is then extracted and the membrane dried.

Hydrophobic microporous membranes are commonly used for contactor applications with an aqueous solution that does not wet the membrane. The solution flows on one side of the membrane and a gas mixture preferably at a lower pressure than the solution flows on the other. Pressures on each side of the membrane are maintained so that the liquid pressure does not overcome the critical pressure of the membrane, and so that the gas does not bubble into the liquid. Critical pressure, the pressure at which the solution will intrude into the pores, depends directly on the material used to make the membrane, inversely on the pore size of the membrane, and directly on the surface tension of the liquid in contact with the gas phase. Hollow fiber membranes are primarily used because of the ability to obtain a very high packing density with such devices.

Packing density relates to the amount of useful membrane surface per volume of the device. It is related to the number of fibers that can be potted in a finished contactor. Also, contactors may be operated with the feed contacting the inside or the outside surface, depending on which is more advantageous in the particular application. Typical applications for contacting membrane systems are to remove dissolved gases from liquids, degassing; or to add a gaseous substance to a liquid. For example, ozone is added to very pure water to form a solution used to wash semiconductor wafers. Many processing steps involved in chip manufacturing use very aggressive chemicals such as hot sulfuric acid, hydrogen peroxide, phosphoric acid, etc. for etching purpose. Since these chemicals are toxic and dangerous, transport, storage and proper disposal of these chemicals pose serious health and safety hazards to the workers in this industry. New processing technologies have been developed in the last few years by a number of chip tool manufacturers. Unlike the conventional process which uses many aggressive chemicals, the new processing technology utilizes only two chemicals—ozonated DI water and HF water. It has been demonstrated that almost all existing processing bath can be replaced using only these two chemicals.

While HF water can easily be produced, a good source for ozonated water has been a challenge. Although ozonated water is being used in chip plants today, most uses are for cleaning operations where only a couple of parts per million (ppm) of ozone concentration are needed in the fluid stream. However, to replace aggressive etch baths, much higher ozone concentration is needed. In general, the concentration ranges between 10-80 ppm. The water flow rate ranged between 5-40 liters per minute (lpm). Typical requirement is about 15 ppm at 20 lpm.

Prior to the present invention, a tube side contacting device has been provided wherein the hollow fibers are formed of a polyfluorinated alkoxyvinylether (PFA) polymer. This device is characterized by undesirably limited gas mass transfer through the hollow fibers. In addition, contact devices have been provided wherein the hollow filter membranes or spirally pleated membranes are formed of PTFE.

Ohmi et al., J. Electrochem. Soc., Vol. 140, No. 3, March 1993, pp. 804-810, describe cleaning organic impurities form silicon wafers at room temperature with ozone-injected ultrapure water. U.S. Pat. No. 5,464,480 shows that ozone diffused through a subambient temperature deionized water will quickly and effectively remove organic materials such as photoresist from waters without the uses of other chemicals.

It is believed that lowering the temperature of the solution enables a sufficiently high ozone concentration in solution to substantially oxidize all of the organic material on the wafer to insoluble gases. The means for diffusing a gas can be any means which provides fine bubbles of ozone or other gases into the tank and uniformly distributes the gas throughout the tank.

In U.S. Pat. No. 5,464,480, preferably, the bubbles that are provided by the diffuser are initially about 25 to about 40 microns in diameter. The gas diffusers preferably are initially about 25 to about 40 microns in diameter. The gas diffusers preferably are made from a mixture of polytetrafluoroethylene (PTFE) and perfluoroalkoxylvinylether. By varying the temperature and pressure under which the mixture is prepared by methods known in the art, both porous and nonporous members are formed. The impermeable and permeable members are preferably comprised of about 95% PTFE and about 5% perfluoroalkoxylvinylether. The permeable member and the impermeable member may be joined by any number of methods as long as the result is a composite member that will not come apart under the stresses in the tank. Preferably, the members are heat sealed together, essentially melting or fusing the members together using carbon-carbon bonds. Once the permeable member is formed, a trench is bored out of the PTFE in the top portion of the member. The resulting diffuser has on the order of about 100,000 pores of a size of about 25 to about 40 microns in diameter through which gas may permeate into the treatment tank. The use of the trench in the diffuser allows the gas to diffuse into the tank as very fine bubbles. In applications for the semiconductor manufacturing industry, a device that supplied homogeneous bubble free ozone dissolved in ultrapure water would provide more efficient oxidation reactions because the reaction would not be localized at the bubbles. The more homogeneous solution would provide for a more uniform cleaning reaction. Furthermore, the high surface area to volume ratio inherent in hollow fiber devices would give a compact system, suitable for semiconductor operations.

Dissolved oxygen in ultrapure water is another problem in semiconductor device manufacturing. Oxygen removal to less than one part per billion (ppb) is required to prevent uncontrolled oxide growth. Potential problems associated with uncontrolled oxide growth are prevention of low temperature epitaxy growth, reduction of precise control of gate-oxide films, and increased contact resistance for VIA holes. This uncontrolled growth can be overcome by stripping dissolved oxygen to less than 1 ppb from the ultrapure water used in the manufacturing process. The high packing density and cleanliness associated with an all perfluorinated thermoplastic contactor are advantages in such applications.

U.S. Pat. No. 5,670,094 provides an oxidized water producing method in which a pressurized ozone gas is generated by an electric discharge type ozonator is dissolved in water to be treated through a hollow fiber membrane, characterized in that the water pressure inside the membrane is maintained higher than the pressure of the ozone gas supplied to the outside of the hollow fiber membrane to prevent tiny bubbles and impurities from getting mixed into the water being treated, and the ozone concentration in the treated water is controlled on the basis of the concentration of the ozone gas. This reference discloses only PTFE membranes and does not contemplate the use of an all perfluorinated thermoplastic contactor.

Commercially all available PTFE hollow tube contactors are referred to as "hollow tubes", probably because they are relatively large. Patent PJ7213880A discloses the fiber manufacturing process for making composite PTFE hollow tubes for ozonizing applications. The first step of this process involves extruding PTFE paste derived from a mixture of PTFE powder and lubricants. After the tube is formed, the lubricants are extracted and the powder sintered into a slightly porous PTFE solid tube. The tube is then stretched longitudinally to make it porous. This is different than typical PTFE sheet membranes made by a similar process. To generate very fine microporous structures, characterized by a node to fibrils network, most PTFE membranes are made by biaxial stretching. For hollow fibers, the equivalent process would have been stretching the fiber radially. Probably because of the impracticality of such a step, this radial stretching step is missing from the disclosed process. Consequently, the pores in this tube are only "half-formed", i.e., it did not attain the "node to fibril network" of flat sheet membrane. To compensate for this deficiency, the tube underwent a second step of laminating a regular microporous flat sheet membrane on top of the external surface of the porous tube. This step involves lamination of a long narrow strip of PTFE microporous membrane spirally on the surface of the tubing. This is a tedious, labor intensive process. Also, with the membrane laminated to the outside of the hollow tube, the resistance to mass transfer in tube-side flow could be higher in cases were the fluid partially intrudes into the support layer. This arrangement diminishes the potential of housing the membrane as the barrier for separating the two fluid phases. These deficiencies are overcome with the hollow fiber membranes of the present invention.

An advantage for contacting applications is that the very low surface tension of these perfluorinated polymers allows use with low surface tension liquids. For example, highly corrosive developers used in the semiconductor manufacturing industry may contain surface tension reducing additives, such as surfactants. These developers could not be degassed with typical microporous membranes because the liquid would intrude the pores at the pressures used and permeate, causing solution loss and excess evaporation. In addition, liquid filling the pores would greatly add to the mass transfer resistance of gas transport. U.S. Pat. No. 5,749,941 describes how conventional follow fiber membranes of polypropylene or polyethylene cannot be used in carbon dioxide or hydrogen sulfide absorption into aqueous solutions containing an organic solvent without the use of a solution additive to prevent leakage. While PTFE membranes would work in these applications, presumably because of their lower surface tension, they are difficult to process into hollow fibers. The membranes of the present invention are made from polymers having similar surface tension properties to PTFE and are more readily manufactured into small diameter hollow fiber membranes.

Accordingly, it would be desirable to provide a hollow fiber membrane contactor apparatus for forming a liquid solution from a gas and a liquid which provides high mass transfer rates of gas through the hollow fiber membranes. Such an apparatus can be formed of a suitably small size to permit its use with currently available apparatus for delivering a reagent to a conventional etching process for making electronic devices.

SUMMARY OF THE INVENTION

In a first embodiment of the present invention, a shell side contact device is provided comprising a shell containing perfluoroalkoxy resin thermoplastic hollow fibers used as a porous barrier. The perfluoroalkoxy resin comprises a copolymer of tetrafluoroethylene and perfluoroalkyl vinyl ether or a tetrafluoroethyl-co-hexafluoropropylene (FEP) copolymer. The perfluoroalkoxy resin is impermeable to water and is permeable to gases such as oxygen, nitrogen or ozone. The perfluoroalkoxy resin hollow fibers can be unskinned, skinned on their inner surface or skinned on their outer surfaces. It is preferred that the hollow fibers be unskinned.

In a second embodiment, a shell side contact device is provided comprising a shell, perfluoroalkoxy resin hollow fibers and spacer means for separating the unpotted hollow fibers adjacent an inlet to the shell for liquid to be introduced into the shell. The spacer means permit liquid flow through the shell at desirably high flow rates with acceptable pressure drop through the shell.

This invention provides for contact device including a thermoplastic perfluoroalkoxy resin hollow fiber membrane contactor with unitary end structures having a high packing density.

The contactor is comprised of a bundle of substantially parallel hollow fiber membranes potted at both ends and having unitary end structures with the housing containing the fibers. The lumens of the hollow fibers are exposed at both ends of the hollow fibers. The perfluorinated thermoplastic hollow fiber membranes of this invention are made of a polymer of a tetrafluoroethyl-co-hexafluoropropylene copolymer or poly (tetrafluoroethylene-co-perfluoro (alkyl-vinylether). Typically, alkyl can be propyl wherein the polymer is referred to in the art as PFA or a mixture of methyl and propyl wherein the polymer is referred to in the art as MFA. PFA is manufactured by DuPont, Wilmington, Del. MFA is described in U.S. Pat. No. 5,463,006. A preferred polymer is Hyflon® POLY (PTFE-CO—PFVAE) 620, obtainable from Ausimont USA, Inc., Thorofare, N.J.

The fibers are made by a Thermally Induced Phase Separation (TIPS) method, in which polymer is dissolved in a halocarbon solvent at high temperatures and extruded through an annular die into a cooling bath. The resulting gel fiber is wound as a continuous coil on a steel frame with the fibers substantially parallel and not touching. The frame and coil are placed in an extraction bath to remove the solvent from the gel fiber. After extraction, the fibers are annealed on the frame for about 24 hours and then cooled. The fibers are removed from the annealing oven and cooled. The porous skinned surface pores are in the diameter range of 0.001 micron to about 0.05 micron. They are then gathered into a cylindrical bundle and potted and bonded in a single step.

Potting is a process of forming a tube sheet having liquid tight seals around each fiber. The tube sheet or pot separates the interior of the final contactor from the environment. The pot is thermally bonded to the housing vessel in the present invention to produce a unitary end structure. The unitary end structure comprises the portion of the fiber bundle which is encompassed in a potted end, the pot and the end portion of the perfluorinated thermoplastic housing, the inner surface of which is congruent with the pot and bonded to it. By forming a unitary structure, a more robust contactor is produced, less likely to leak or otherwise fail at the interface of the pot and the housing. The potting and bonding process is an adaptation of the method described in U.S. Provisional Patent Application Ser. No. 60/117,853 filed Jan. 29, 1999, the disclosure of which is incorporated by reference.

Potting and bonding are done in a single step. An external heating block is used for potting one end at a time. The perfluorinated thermoplastic end seals are preferably made of poly(tetrafluoroethylene-co-perfluoro (alkylvinylether)) having a melting point of from about 250° C. to about 260° C. A preferred potting material is Hyflon® 940 AX resin, from Ausimont U.S.A., Inc., Thorofare, N.J. Low viscosity poly (tetrafluoro-ethylene-co-hexafluoropropylene) with low end-of-melt temperatures as described in U.S. Pat. No. 5,266,639 is also suitable. The process involves heating the potting material in a heating cup at about 275° C. until the melt turns clear and are free of trapped bubbles. A recess is made in the molten pool of potting material that remains as a recess for a time sufficient to position and fix the fiber bundle and housing in place. Subsequently, the recess will fill with the molten thermoplastic in a gravity driven flow.

A unitary end structure, by which is meant that the fibers and the pot are bonded to the housing to form a single entity consisting solely of perfluorinated thermoplastic materials, is prepared by first pretreating the surfaces of both ends of the housing before the potting and bonding step. This is accomplished by melt-bonding the potting material to the housing. The internal surfaces on both ends of the housing are heated closer to its melting point or just at the melting point and immediately immersed into a cup containing powdered poly (tetrafluoroethylene-co-perfluoro (alkylvinylether) (PTFE-CO-PFVAE)) potting resin. Since the surface temperature of the housing is higher than the melting point of the potting resins, the potting resin is then fused to the housing resin. The housing is then removed and polished with a heat gun to fuse any excess unmelted powder. Without this pretreatment step, the housing surfaces often detach from the potting surfaces because of absence of intermixing of the two resins.

The unitary end structure is cut and the lumen of the fibers exposed. The potting surfaces are then polished further using a heat gun to melt away any smeared or rough potted surfaces. A solder gun can be used to locally remelt and repair any defective spot, sometimes with the help of a drop of melted resin.

The shell side contactor of the invention provides substantial advantages over the tube side contactor of the prior art. In one aspect of this invention, the shell side contactor is highly efficient in that the ozonated product comprises at least 0.34 ppm ozone per liter aqueous liquid per liter of interior shell volume. This value comes from a volume calculation based on the diameter of the housing; when the volume calculation is based upon the radius of the housing, this efficiency value is 1.36 ppm. ($V=\pi r^2 h$).

In another aspect of this invention, the shell volume containing the hollow fibers is free of apparatus which promotes turbulent liquid flow within the shell.

DETAILED DESCRIPTION OF THE INVENTION

Figure 1:
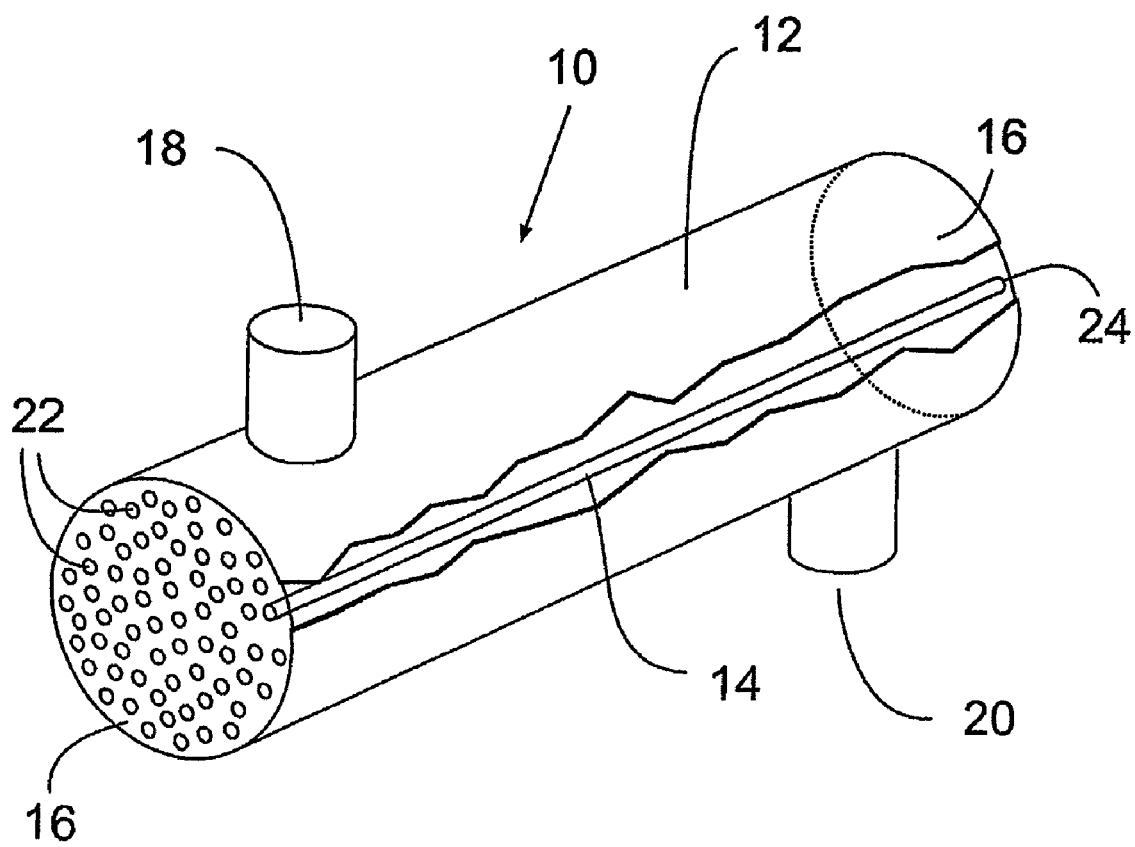
FIG. 1 is an illustration of a shell side hollow fiber membrane contactor of this invention.

The asymmetric skinned hollow fiber membrane is produced by the process described in concurrent U.S. Provisional Patent Application Ser. No. 60/117,854 filed Jan. 29, 1999, the disclosure of which is incorporated by reference. That process is based on the Thermally Induced Phase Separation (TIPS) method of making porous structures and membranes. A mixture of perfluorinated thermoplastic polymer pellets, usually ground to a size smaller than supplied by the manufacturer, from about 100 to about 1000 microns, preferably about 300 microns, more preferably supplied or ground to a powder, and a solvent, such as chlorotrifluoroethylene oligomer, is first mixed to a paste or paste-like consistency. The polymer comprises between approximately 12% to 75%, preferably 30% to 60%, by weight of the mixture. The polymers are perfluorinated thermoplastic polymers, more specifically poly(tetrafluoroethylene-co-perfluoro (alkylvinylether) such as PFA or MFA or tetrafluoroethylene-co-hexafluoropropylene) (FEP), or blends of these polymers, which are dissolved in a solvent to give a solution having an upper critical solution temperature, and which when the solution is cooled, separates into two phases by liquid-liquid phase separation.

The solvent is chosen so the membrane formation occurs by liquid-liquid phase separation, rather than solid-liquid phase separation when the solution is extruded and cooled. Preferred solvents are saturated low molecular weight polymers of chloro-trifluoroethylene. A preferred solvent is Halo-Vac® 60 from Halocarbon Products Corporation, River Edge, N.J. The choice of the solvent is dictated by the ability of the solvent to dissolve the polymer when heated to form an upper critical solution temperature solution, but not to excessively boil at that temperature. Fiber extrusion is referred to as spinning and the extruded fiber length from the die exit to the take-up station is referred to as the spin line. The paste is metered into a heated extruder barrel where the temperature raised to above the upper critical solution temperature so that dissolution occurs. For inside skinned hollow fiber membranes, the homogeneous solution is then extruded through an annular die directly into a liquid cooling bath with no air gap. The lumen diameter is maintained with a constant pressure of gas. The liquid cooling bath is maintained at a temperature below the upper critical solution temperature of the polymer solution. The preferred bath liquid is not a solvent for the thermoplastic polymer, even at the extrusion temperature. Upon cooling, the heated and shaped solution undergoes phase separation and a gel fiber results. The die tip is slightly submerged for vertical spinning, i.e., the spin line falls downward, in the direction of a freely falling body. For horizontal spinning, where the spin line exists directly in the horizontal attitude, and is maintained more or less in that plane until at least the first guide roll, a specially design die is used. The die is firmly positioned against an insulated wall with the die tip penetrating through an opening having a liquid-tight seal in the insulator wall. A trough for cooling liquid flow is placed in a recess in the opposite side of the insulating wall, in a manner that will maintain the die nose outlet in a submerged condition. Cooling liquid flows in the trough and overflows in a region of the trough of lesser depth, keeping the die nose outlet submerged with a flow of cooling liquid.

In both the vertical and horizontal methods, a booster heater and temperature control means is used to briefly raise the solution temperature at the die tip to prevent premature cooling. In the subsequent step, the dissolution solvent is removed by extraction and the resultant hollow fiber membrane is dried under restraint to prevent membrane shrinkage and collapse. Optionally, the dried fiber may be heat set at 200° C. to 300° C. Preferably the fiber will be heat set or annealed under restraint at a temperature near the melting temperature of the fiber, which for the preferred polymer of this invention is within a range of from about 270° C. to about 290° C., preferably from about 275° C. to about 285° C., with the most preferred range from about 278° C. to about 282° C. In order to minimize shrinkage during potting, a second, unrestrained, annealing step at similar temperatures is a preferred step. Annealing times for these steps is from about 6 to about 48 hours, more preferably, from about 18 to about 30 hours.

In the invention described in U.S. Provisional Patent Application Ser. No. 60/117,854, controlled evaporation of solvent from at least one surface of the hollow fiber as it exists the die tip is combined with higher polymer solids solutions and the submerged extrusion process to produce inner diameter skinned asymmetrical hollow fiber porous membranes from perfluorinated thermoplastic polymers. For this embodiment, the lumen is maintained with a constant pressure of a gas continuously fed into the inner diameter of the lumen. In this embodiment the superheated solvent evaporates inside the lumen as soon as it emerges from the die. The loss of solvent causes a superficial increase in solids concentration on the inner lumen surface. As the melt is quenched, a very thin skin is formed on the lumen surface, while the rest of the membrane forms a microporous structure due to its being submerged in a cooling or quenching bath which prevents the porogen from flashing off the outer surface and prevents the formation of a skin on the outer surface.

To produce an asymmetric skinned perfluorinated thermoplastic hollow fiber membrane with the skin on the outer surface, the process described above is adapted so the lumen is filled with a liquid to prevent evaporation at the inner surface and the outer surface is exposed to the atmosphere in a very short air gap before entering the cooling bath. The lumen-filling liquid can be a liquid that does not boil or excessively vaporize during the extrusion process. Preferred liquids are mineral oil, silicone oil, and dioctylphthalate, with a most preferred liquid being a low molecular weight saturated chlorotrifluorohydrocarbon polymer.

To produce unskinned perfluorinated thermoplastic microporous hollow fiber membrane, the teachings of U.S. Provisional Patent Application Ser. Nos. 60/117,852 and 60/117,853 filed Jan. 29, 1999, are used. This application provides for high flux, skin-free hollow fiber porous membranes, more specifically, microporous membranes, from perfluorinated thermoplastic polymers, more specifically PFA or MFA or blends of these polymers.

The process to produce these membranes is based on the Thermally Induced Phase Separation (TIPS) method of making porous structures and membranes. A mixture of polymer pellets, usually ground to a size smaller than supplied by the manufacturer, from about 100 to about 1000 microns, preferably about 300 microns, more preferably supplied or ground to a powder and an solvent, such as chlorotrifluoro-ethylene oligomer, is first mixed to a paste or paste-like consistency. The polymer comprises between approximately 12% to 35% by weight of the mixture. The solvent is chosen so the membrane formation occurs by liquid-liquid, rather than solid-liquid phase separation when the solution is extruded and cooled. Preferred solvents are saturated low molecular weight polymers of chlorotrifluoroethylene. A preferred solvent is HaloVac® 60 from Halocarbon Products Corporation, River Edge, N.J. Choice of the solvent is dictated by the ability of the solvent to dissolve the polymer when heated to form an upper critical solution temperature solution, but not to excessively boil at that temperature.

Fiber extrusion is referred to as spinning and the extruded fiber length from the die exit to the take-up station is referred to as the spin line. The paste is metered into a heated extruder barrel where the temperature raised to above the upper critical solution temperature so that dissolution occurs. The homogeneous solution is then extruded through an annular die directly into a liquid cooling bath with no air gap. The liquid cooling bath is maintained at a temperature below the upper critical solution temperature of the polymer solution. The preferred bath liquid is not a solvent for the thermoplastic polymer, even at the extrusion temperature. Upon cooling, the heated and shaped solution undergoes phase separation and a gel fiber results. The die tip is slightly submerged for vertical spinning, i.e., the spin line falls downward, in the direction of a freely falling body.

For horizontal spinning, where the spin line exits directly in the horizontal attitude, and is maintained more or less in that plane until at least the first guide roll, a specially design die is used. The die is firmly positioned against an insulated wall with the die tip penetrating through an opening having a liquid-tight seal in the insulator wall. A trough for cooling liquid flow is placed in a recess in the opposite side of the insulating wall, in a manner that will maintain the die nose outlet in a submerged condition. Cooling liquid flows in the trough and overflows in a region of the trough of lesser depth, keeping the die nose outlet submerged with a flow of cooling liquid. In both the vertical and horizontal methods, a booster heater and temperature control means is used to briefly raise the solution temperature at the die tip to prevent premature cooling. In a subsequent step, the dissolution solvent is removed by extraction and the resultant hollow fiber membrane is dried under restraint to prevent membrane shrinkage and collapse. Optionally the dried fiber may be heat set at 200° C. to 300° C.

The potting method is described in concurrent U.S. Provisional Patent Application Ser. No. 60/117,853 filed Jan. 29, 1999, incorporated by reference. This application describes a simplified method for manufacturing a filter element of perfluorinated thermoplastic hollow fiber membranes potted with a perfluorinated thermoplastic polymer. The method comprises vertically placing a portion of a bundle of hollow fiber membrane lengths with at least one closed, by the closed end, into a temporary recess made in a pool of molten thermoplastic polymer held in a container, holding the fiber lengths in a defined vertical position, maintaining the thermoplastic polymer in a molten state so that it flows into the temporary recess, around the fibers and vertically up the fibers, completely filling the interstitial spaces between fibers with the thermoplastic polymer. A temporary recess is a recess that remains as a recess in the molten potting material for a time sufficient to position and fix the fiber bundle in place and then will be filled by the molten thermoplastic. The temporary nature of the recess can be controlled by the temperature at which the potting material is held, the temperature at which the potting material is held during fiber bundle placement, and the physical properties of the potting material.

A temporary recess can also be recess in a solid thermoplastic which will fill when the thermoplastic is heated to a temperature sufficiently above its softening or melting temperature to flow, and held at that temperature for the time necessary to fill the recess. The end of the fiber can be closed by sealing, plugging, or in a preferred embodiment, by being formed in a loop.

Referring to FIG. 1, the shell side contactor 10 of this invention includes a shell 12 formed of a copolymer of tetrafluoroethylene and perfluoroalkyl vinyl ether such as PFA or MFA or the like. Positioned within the shell is a plurality of hollow fibers 14 formed of a polymer composition described above. The fibers 14 are potted at each end of the shell 12 with a potting composition 16 as set forth above. In use, a liquid enters shell 12 through inlet 18 and is removed from shell 12 through outlet 20. Gas enters the lumens of hollow fiber 14 through gas inlets 22 utilizing a conventional manifold (not shown) and is removed from the lumens through gas outlets 24. Gas such as ozone, passes through the hollow fiber walls and is dissolved in the liquid such as water to form an aqueous ozone solution that can be utilized as an etchant. Ozone is produced by subjecting an oxygen containing gas such as 99% oxygen and 1% nitrogen to an electrical discharge in a manner well known in the art.

Packing density relates to the amount of useful membrane surface per volume of the device. It is related to the number of fibers that can be potted in a finished contactor. During potting the fibers cannot be packaged too tightly in the hollow body or in a free-standing bundle, or they will prevent flow between fibers with the result of incomplete potting. If the packing density is correctly chosen for the specific fibers being potted, the flowing potting material will force the fibers apart. Packing density is defined as the ratio, expressed as a percentage, of the total cross-sectional area of all the fibers in the bundle to the inner area of the hollow body. For fiber bundles potted without being placed in a hollow body, the ratio is the area of the total cross-sectional area of all the fibers in the bundle to the cross-sectional area of the final potted fiber bundle. "Too tightly" is a function of packing density, final potted length, and fiber stiffness. A practitioner skilled in the art can determine the preferred packing density for a specific hollow fiber membrane. For porous hollow fiber membranes made from poly(tetrafluoroethylene-co-perfluoro(alkylvinylether)) with an outer diameter of approximately 800-1000 microns and a wall thickness of approximately 200 microns, and about 10 centimeters long, a packing density of at least less than 7000, and preferably at least less than 6500, gave satisfactory potted fibers.

Figure 2:
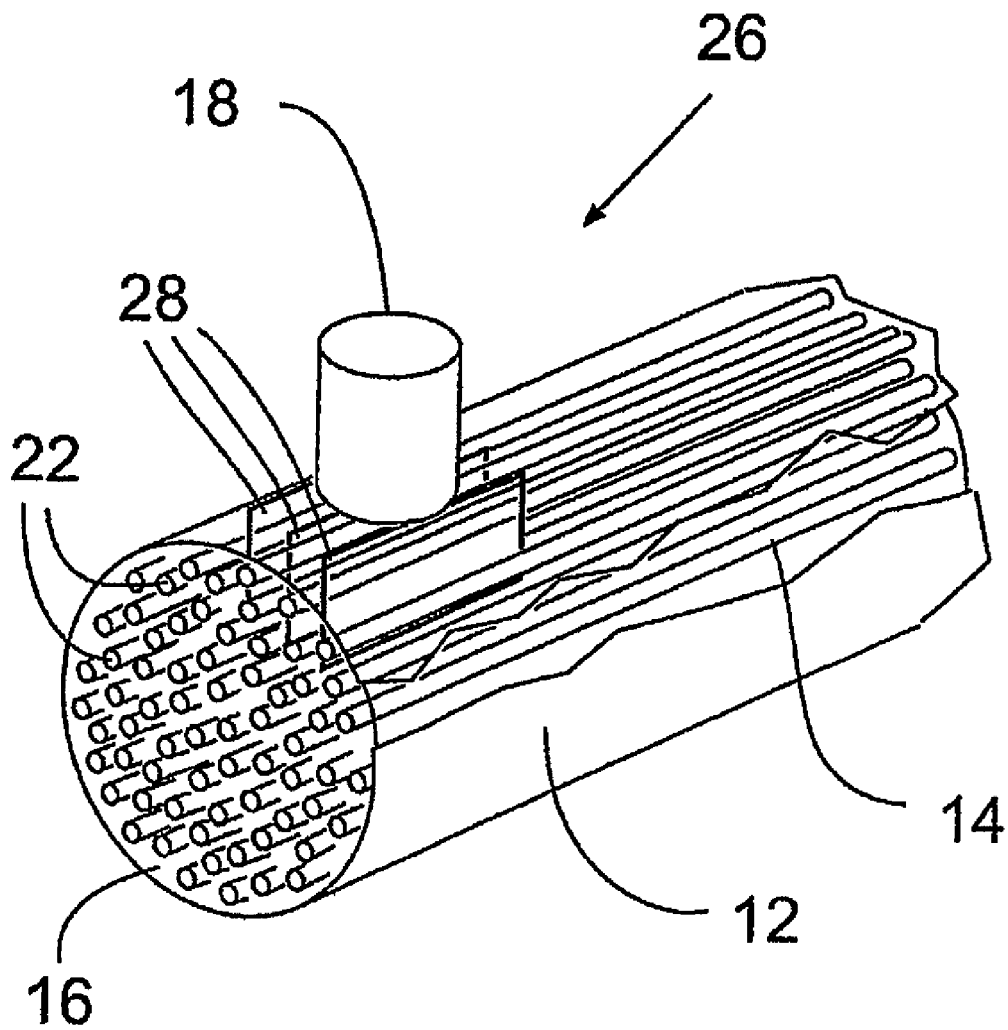
FIG. 2 is an illustration of a shell side hollow fiber contactor of this invention including parallel plate spacers.

Referring to FIG. 2, the shell side contactor 26 includes the potting composition 16 and hollow fibers 14 as well as parallel positioned spacer plates 28 that spread the hollow fiber 14 thereby to promote free flow of liquid within contactor 26 to reduce pressure drop within shell 12.

Figure 3:
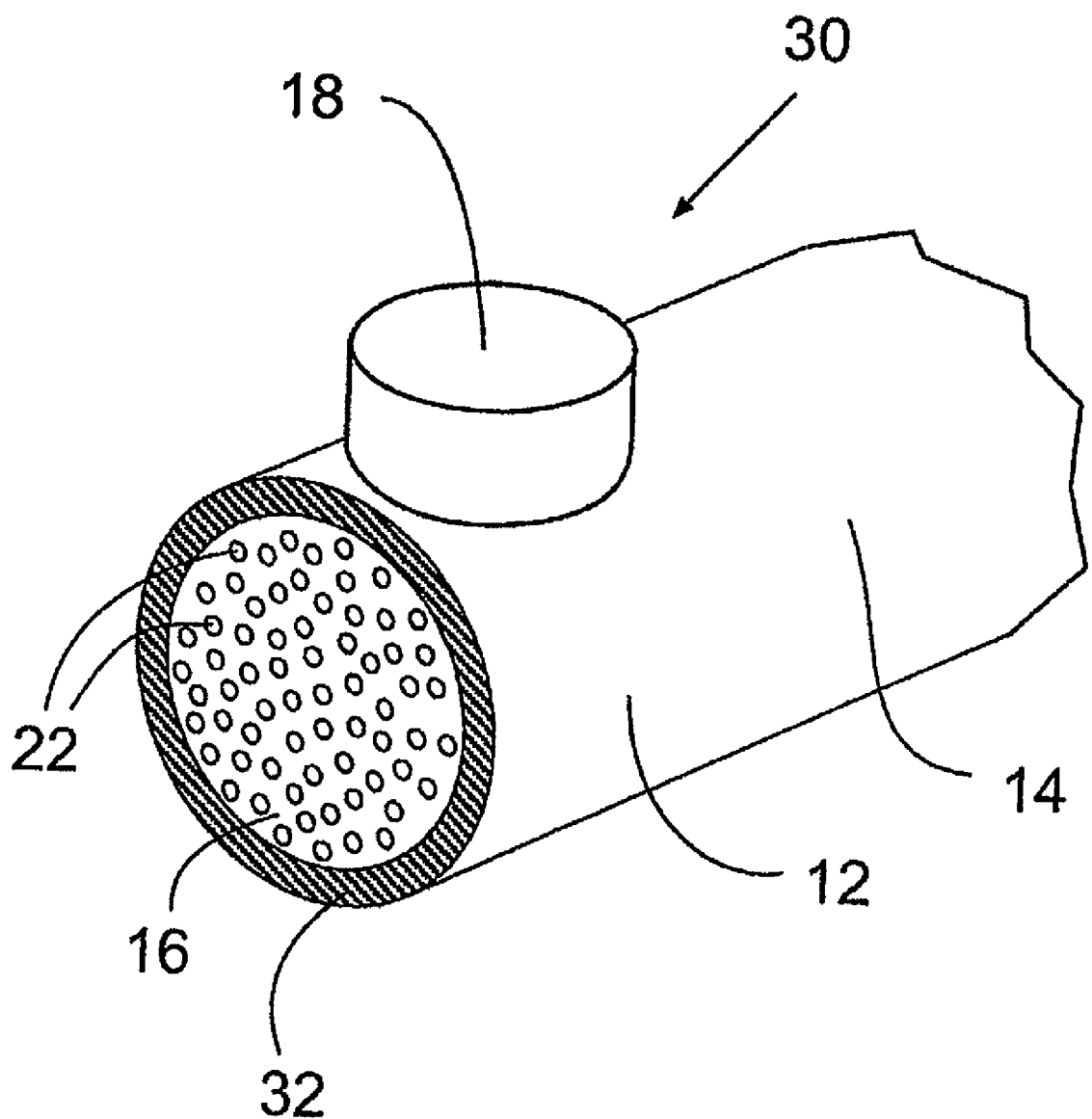
FIG. 3 is an illustration of a shell side contactor of this invention including a thick shell wall spacer.

Referring to FIG. 3, contactor 30 includes shell wall portion 30 which is thicker adjacent the liquid inlet 18 that the remainder of the shell wall 32 positioned remote from the inlet 18. This configuration increases the volume of open space adjacent inlet 18 thereby to reduce pressure drop within the shell 12.

Figure 4:
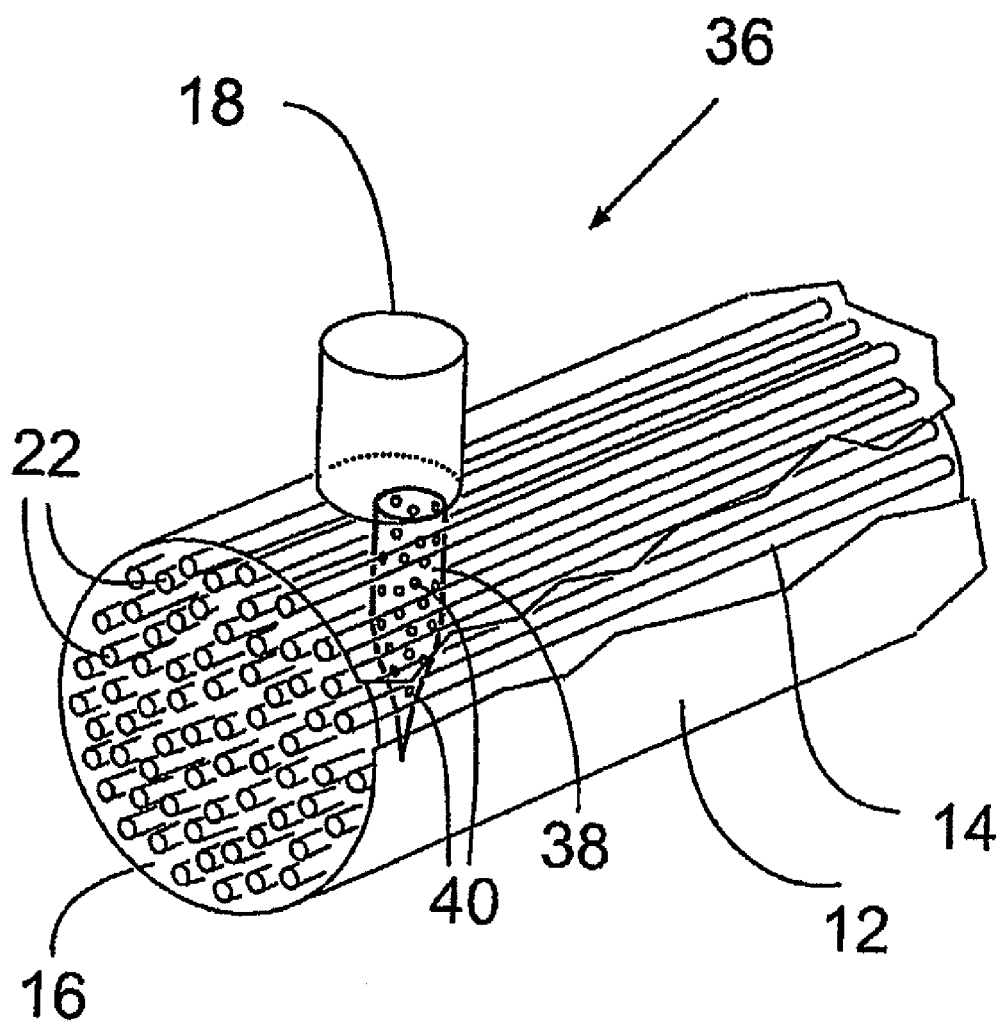
FIG. 4 is an illustration of a shell side hollow fiber contactor of this invention including a tubular spacer extending through the liquid inlet to a shell.

Referring to FIG. 4, the contactor 36 includes an extended tube 38 which separates hollow fiber 14. The tube 38 includes holes 40 through which liquid can pass into the shell 12. The tube 38 promotes ingress of liquid into the shell 12 and to reduce pressure drop through the shell 12.

The present invention provides a shell side contactor which is highly efficient for forming relatively high concentration of ozonated water which contains at least about 0.34 ppm ozone per liter aqueous liquid per liter of interior housing volume (or 1.36 ppm for a radius volume calculation), preferably, at least 0.43 ppm ozone per liter aqueous liquid per liter of interior housing volume (or 1.72 ppm for a radius volume calculation).

All performance claims in this patent application pertain to ozone contacting use an ozone gas condition of 250 g/Nm$^3$, 5 standard liters per minute (slpm) and 22 pounds per square inch gauge (psig) of gas pressure.

The efficiency produced by the present invention permits utilizing a desirably lower volume shell at relatively high flow rates of ozone and water through the shell side contactor of this invention. In addition, the efficiency of the present invention permits operating the shell side contactor on a one-pass basis of liquid through the contactor. This operation eliminates the need for a liquid flow path and accompanying pumping capacity to effect passage of the liquid through the contactor a plurality of times in order to produce an ozonated water product containing a desired minimum ozone concentration. Thus, the shell side contactor of this invention provides substantial advantages over prior art contactors which require a multiple pass liquid flow path.

In another aspect of this invention, the shell (housing) side contactor of this invention has a high packing density of at least 0.34 m$^2$ membrane area/liter of interior shell volume, preferably at least 0.60 m$^2$ membrane area/liter of interior shell volume, so that the efficiencies set forth above are obtained. These high packing densities are obtained when utilizing hollow fibers having an exterior diameter of between about 300 microns and 1500 microns and preferably between about 600 microns and 1000 microns and an interior diameter between about 250 microns and 1100 microns. A packing density up to about 1.2 m$^2$ membrane area/liter of interior shell volume can be obtained with the contactor of this invention.

In addition, the present invention provides a shell side contactor which is free of apparatus which effects turbulent liquid flow within the shell. The exclusion of such apparatus is advantageous since particle formation from turbulent flow activator apparatus is eliminated. The lack of such particles is essential when processing ozonated aqueous composition utilized in the electronics industry. In addition, such an apparatus provides a simple construction which reduces manufacturing costs. The apparatus of this invention contrasts, for example with the Liqui-Cel™ contactor provided by Hoechest Celanese Corporation which utilizes hollow fibers positioned on a flexible substrate, such as a woven substrate which includes a turbulent liquid inducing baffle within the shell.

In operating the shell-side contactor of this invention, the inlet gas pressure at the hollow fiber inlets typically is between about 1 and about 45 psig, preferably between about 10 and about 45 psig. Typical outlet gas pressure drop at the hollow fiber outlets is between about 0.1 and about 5 psig, preferably between about 0.1 and about 1 psig. Typical liquid pressure drop at the shell inlet typically is between about 5 and about 45 psig, preferably between about 2 and about 15 psig. When operating under these conditions of pressure, the efficiency and high packing densities set forth above are obtained. In addition, when operating under these conditions, gas bubbles within said liquid are prevented while permitting dissolution of the gas such as ozone in the liquid such as water.

Characterization Methods

The shell side contactor of this invention provides substantial advantages over a tube side-contactor. The mass transfer equation of tube-side flow is characterized by the following equation.

$$Sh = K*d/D_{ab} = 1.64*R^{0.33}Sc^{0.33}*(D/L)^{0.33}$$

where:

Sh=Sherwood Number,

K=mass transfer coefficient, cm/s,

L=length of fiber, cm d=ID of fiber, cm.

$D_{ab}$=diffusion coefficient of ozone, cm²/sec

Re=Reynold's Number, $\rho v d/\mu$

Sc=Schmidt's Number, $\mu/\rho D_{ab}$ v=velocity, cm/sec $\rho$=density, grams/cm³

It can be deduced from the above equation that as the device gets longer (larger L), the mass transfer coefficient per membrane area will drop accordingly. Keeping the device short and increasing the number of fibers also doesn't provide satisfactory results. The reason is that with more fibers, the flow per fiber (v in the above equation) will drop, again resulting in reduced mass transfer/area. Therefore, in tube-side flow, although adding membrane area always results in higher performance, the mass transfer performance always increases much less than the increase in membrane area. The reason for reduced mass transfer is that as the fiber length increases, so is the thickness of diffusion the boundary layer. Thicker boundary layer means lower mass transfer.

Shell-side mass transfer is much more efficient, the mass transfer is characterized by the following equation:

$$Sh = K*d/D_{ab} = 0.36*Re^{0.55}Sc^{0.33}$$

Notably missing from the above equation, when compared with the tube-side equation, is the dependency of d, diameter of the fiber and L, the length of the fiber. The benefit of shell-side transfer can be estimated by dividing the shell-side equation by the tube-side equation. It can be found that shell-side is between 5 times (5x) to 10 times (10x) better than tube-side. An additional benefit of shell-side transfer surface is the external membrane area. Since external membrane area is always larger than the internal area (tube-side transfer), shall-side transfer has the benefit of a larger contact area.

Although shell-side mass transfer has many advantages, in general, design and construction of the device is more complicated. Usually it involves a center tube distribution for the liquid. The fibers may have to be woven onto a supporting mat. All these additional construction elements, which are absent in the tube-side configuration, pose significant challenges to the cartridge manufacturing process. In addition, supporting materials such as threads and mats are potential particle generators which may significantly contribute to microcontamination.

The advantage of this invention is that the ability to obtain substantial benefits from shell-side mass transfer with relatively simple construction method. While this method doesn't provide the full benefit of shell-side mass transfer, the manufacturing cost for such a module is also less.

A tube-side module is usually constructed with two large fittings at both ends for water to flow through the lumen of the hollow fibers. Two small gas fittings would be located on the shell near the exit and the entrance of the module. In this invention, the fittings and the flow of the liquid and gas are reversed. In other words, two small fittings, e.g., ¼ inch, are located at either end of the module for gas flow, while large fittings are bonded on the shell at cross direction near the exit and entrance of the module. The large fittings, e.g., ½ inch to 1 inch, are needed for carrying water flow rate up to 10 gallons per minute (gpm).

A shell-side module cannot be made just by reversing the flow and the fittings because the fiber bundle would produce enormous pressure drops (>30 psig@5 gpm). The packing density has to be reduced and the fiber bundle arrangement near the fittings has to be modified to minimize the pressure drop but at the same time avoiding massive channeling of water flow. We have found that pressure drop can be substantially reduced by decreasing the packing density from 58% to 48% and also offsetting the fiber bundle at the potted area. In addition, it also has been found that the mass transfer efficiency can be enhanced by jetting water into the fiber bundle and introducing gaps into the bundle.

Figure 7:
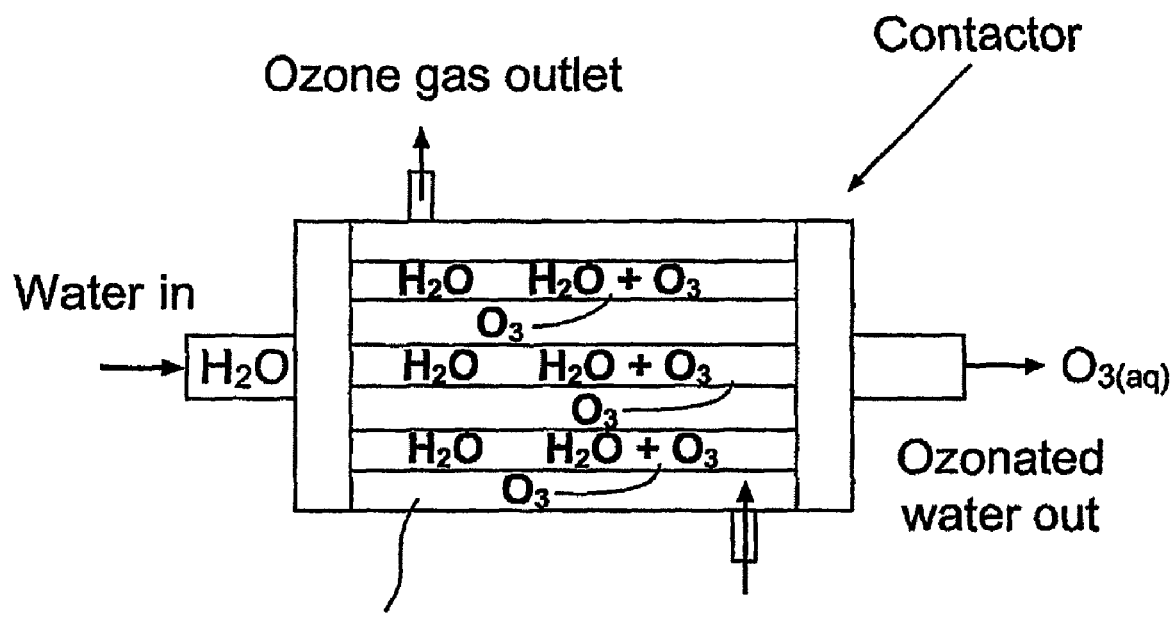
FIG. 7 is an illustration of a prior art, tube side contactor.

FIG. 7 shows a typical tube side flow pattern of the Prior Art hollow fiber contactor. In the tube side configuration the liquid flows inside the lumen of the fiber and the ozone gas flows (on the outer surface of the fiber) across shell side. The porous structure of hollow fibers, without dense skin, allows only gas to diffuse through the membrane and dissolve in the water flowing in the lumen. The liquid and gas flows are switched for the shell side configuration—the liquid flows through the shell side and the ozone gas is routed through the fiber lumens. For optimum performance the gas and liquid flows should be countercurrent. The contactor can be mounted either horizontally or vertically. As we describe below the two flow configurations offer widely different ozone transfer efficiency. Performance depends on the gas side flow rate, pressure, and concentration; and the liquid side flow rate, pressure, temperature, and pH.

Figure 8:
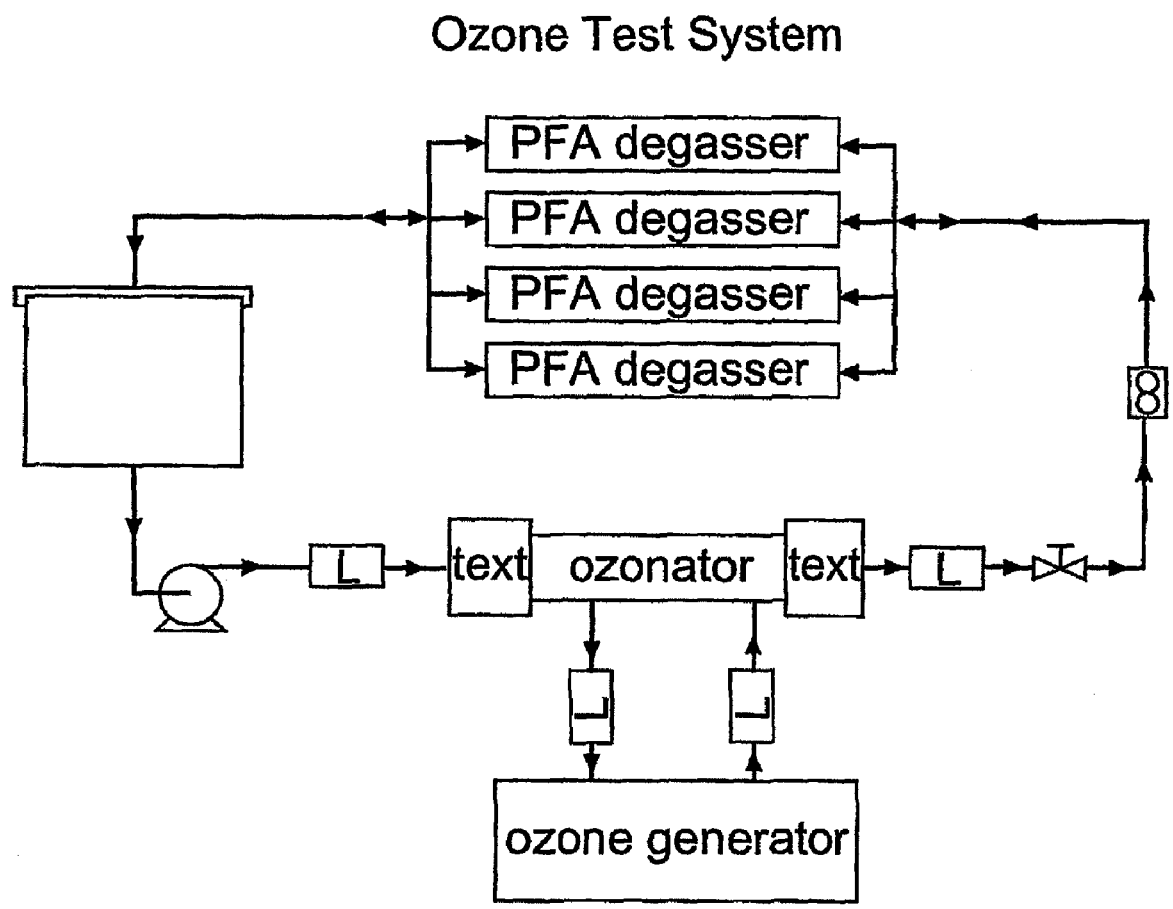
FIG. 8 is an illustration of an ozone test system.

All experiments were performed on the system shown in FIG. 8. It is a recirculation type system; the all PFA degassers are installed to provide a constant deionized (DI) water feed stream free of ozone.

Example 1

A contactor with dimensions of 2.25 inch inner diameter (ID) and 12 inches in length was made using porous skinless PFA hollow fibers. The fiber outer diameter (OD) was about 800 microns and the inner diameter (ID) about 500 microns. The number of the fibers was about 2100 and the packing density was around 0.46 m² of external membrane area per liter of internal cartridge volume. The fiber bundle was potted with an offset of ¼ inch gas fitting at both end of the module. Two 1 inch fittings for water flow were bonded on the shell at cross-direction near the exit and entrance. The inside of the fitting was reduced to ½ inch using an insert to create jetting action of water into the bundle. The water fittings are located perpendicular to the offset of the potting such that a cavity is formed right under the fitting.

Figure 6:
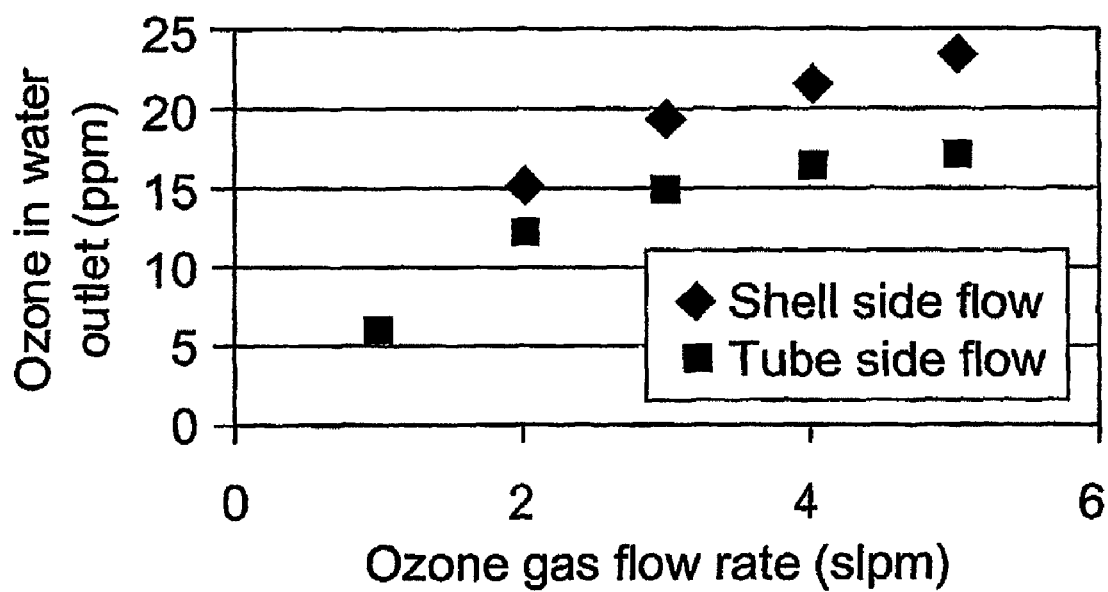
FIG. 6 compares the shell side flows vs. tube side flow on ozone concentration for the contactor of Example 1.

The contactor was tested for ozonation efficiency. Ozone gas at 22 psig, 250 g/Nm³ and 5 slpm was fed into the gas port of the contactor. Deionized water was pumped into the contactor using the shell-side water fitting at a rate of 5 gpm at 25° C. The water pressure drop across the module was about 5 psig. The concentration of ozone in the outlet water was measured using an IN-USA ozone sensor. After a couple of minutes, the ozone concentration in the water reached 23 ppm. Under the same operating conditions, the same contactor would produce less than 15 ppm using tube-side mode mass transfer. Therefore, the ozonation efficiency improvement was about 50%. The ozonation efficiency for this module was 0.4 ppm/lpm/liter of cartridge volume. This value comes from a volume calculation based on the diameter of the housing; when the volume calculation is based upon the radius of the housing, this efficiency value is 1.6 ppm. A comparison of the effect on ozone concentration over a shell side contactor of this invention and a tube side contactor is shown in FIG. 6.

Example 2

A contactor with dimensions of 2 inches ID and 15 inches in length was made using porous skinless PFA hollow fibers. The fiber OD was about 800 micron and the ID about 500 micron. The number of the fibers was about 1700 and the packing density was around 0.42 m membrane per liter of internal cartridge volume. The contactor was fitted with ¼ inch gas fitting at both end of the module. Two ½ inch fittings for water flow were bonded on the shell at cross direction near the exit and entrance.

Figure 5:
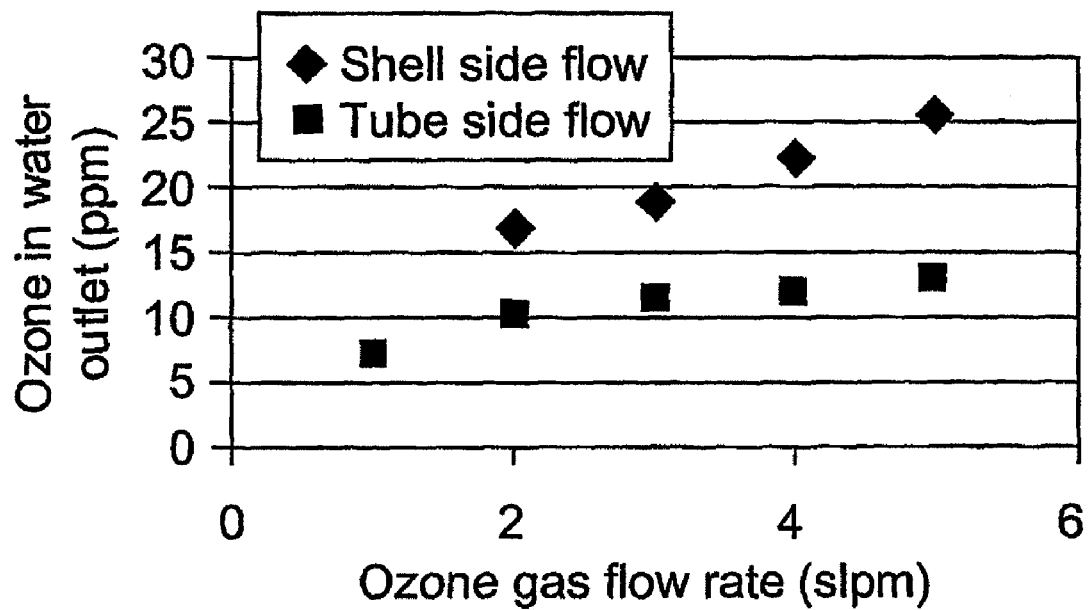
FIG. 5 compares the shell side flows vs. tube side flow on ozone concentration for the contactor of Example 2.

The contactor was tested for ozonation efficiency. Ozone gas at 22 psig, 250 g/Nm$^3$ and 5 slpm were fed into the gas port of the contactor. DI water was pumped into the contactor using the shell-side water fitting at a rate of 5 gpm at 25° C. The pressure drop was less than 5 psig. The concentration of ozone in the outlet water was measured using an IN-USA ozone sensor. After a couple of minutes, the ozone concentration in the water reached 26 ppm. Under the same operating conditions, the same contactor would produce less than 12 ppm using tube-side mode mass transfer. Therefore, the ozonation efficiency improvement was more than 100%. The ozonation efficiency of this module was 0.45 ppm/lpm/liter of internal cartridge volume. This value comes from a volume calculation based on the diameter of the housing; when the volume calculation is based upon the radius of the housing, this efficiency value is 1.8 ppm. A comparison of the effect on ozone concentration over a shell side contactor of this invention and a tube side contactor is shown in FIG. 5.

Example 3

A contactor with dimensions of 2.25 inches ID and 12 inches in length was made using porous skinless PFA hollow fibers. The fiber outer diameter (OD) was about 700 microns and the inner diameter (ID) about 400 microns. The number of the fibers was about 4000 and the packing density was around 0.86 m$^2$ of external membrane area per liter of internal cartridge volume. The fiber bundle was potted with an offset of ¼ inch gas fitting at both end of the module. Two 1 inch fittings for water flow were bonded on the shell at cross-direction near the exit and entrance. The inside of each fitting was reduced to ½ inch using an insert to create jetting action of water into the bundle. The water fittings are located perpendicular to the offset of the potting such that a cavity is formed right under the fitting.

The contactor was tested for ozonation efficiency. Ozone gas at 22 psig, 250 g/Nm$^3$ and 5 slpm was fed into the gas port of the contactor. Deionized (DI) water was pumped into the contactor using the shell-side water fitting at a rate of 5 gpm at 25° C. The water pressure drop across the module was about 8 psig. The concentration of ozone in the outlet water was measured using an IN-USA ozone sensor. After a couple of minutes, the ozone concentration in the water reached at least 35 ppm. Under the same operating conditions, the same contactor would produce less than 16 ppm using tube-side mode mass transfer. Therefore, the ozonation efficiency improvement was about 100%. The ozonation efficiency for this module was 0.61 ppm/lpm/liter of cartridge volume. This value comes from a volume calculation based on the diameter of the housing; when the volume calculation is based upon the radius of the housing, this efficiency value is 2.44 ppm.

Figure 9:
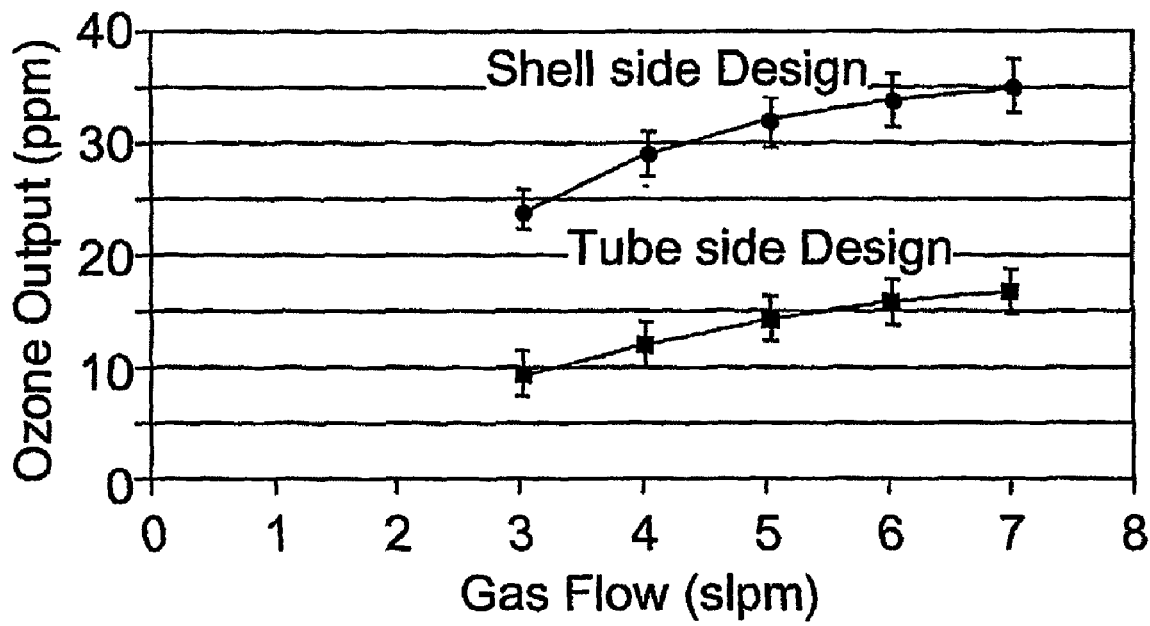
FIG. 9 compares the shell side flows vs. tube side flow on ozone concentration for the contactor of Example 3.
Figure 10:
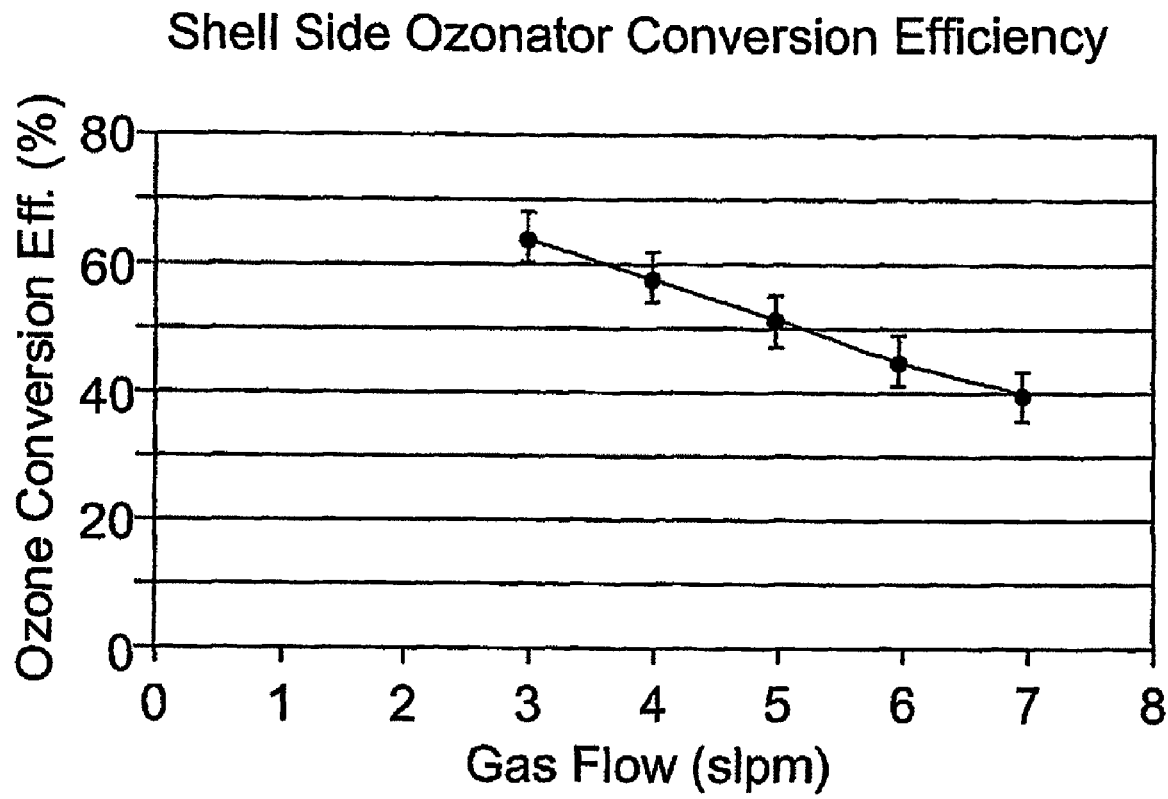
FIG. 10 illustrates the efficiency of a shell side hollow fiber contactor of this invention.
Figure 11:
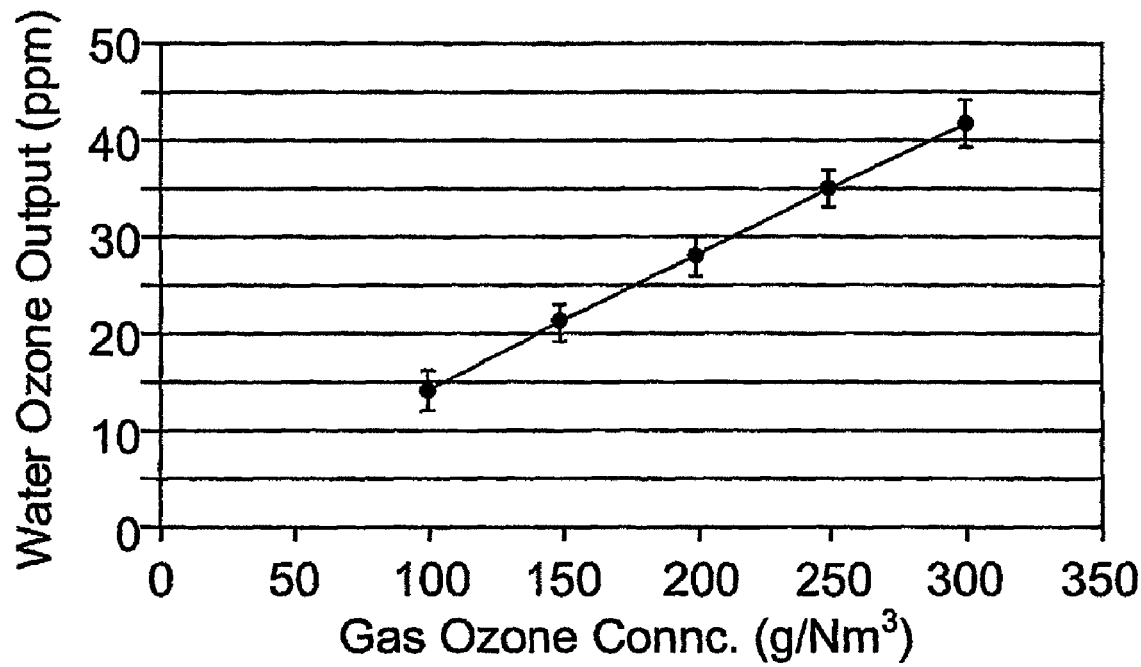
FIG. 11 illustrates the performance of a shell side hollow fiber contactor of this invention.

A comparison of the effect on ozone concentration over a shell side contactor of this invention and a tube side contactor is shown in FIG. 9. The shell side module output increases from 25 ppm ozone at 3 slpm gas flow to 35 ppm at 7 slpm (at 20 liters per minute DI water flow rate, 250 g/Nm$^3$ gas concentration and 22 psi gas pressure). Such a high level of performance results from a high conversion efficiency (the amount of ozone transferred from gas side to water side) of over 60% at 3 slpm (see FIG. 10). The higher recovery is achieved as shell-side turbulence lowers the boundary layer impedance and results in higher mass transfer per unit membrane area. The high recovery helps lower the cost of ownership of the process tool. As seen in FIG. 11, increasing the ozone gas side concentration increases the water ozone output.

Example 4

The effect of water side conditions on performance was investigated. The effect investigated in this example was the effect of flow rate and temperature.

At a given temperature, the dissolved ozone level output in DI water depends on the water flow rate. At the gas-water interface, at the fiber wall, the ozone concentration is the equilibrium value given by the Henry's law (Equation 1), which states that the ozone concentration in liquid, X (mol ozone/mol solvent), is proportional to ozone pressure in the gas phase, P (atm).

Henry's Law: P=HX    (Equation 1)

The proportionality constant (H) is called Henry's coefficient, which varies with temperature (T) and pH. See Equation 2 below, taken from John A. Roth, "Solubility of Ozone in Water", Ind. Eng. Chem. Fundam. 1981, 20, 137-140]:

$H=3.8\times10^7[OH-]^{0.035}\exp(2428/T)$    (Equation 2)

Figure 12:
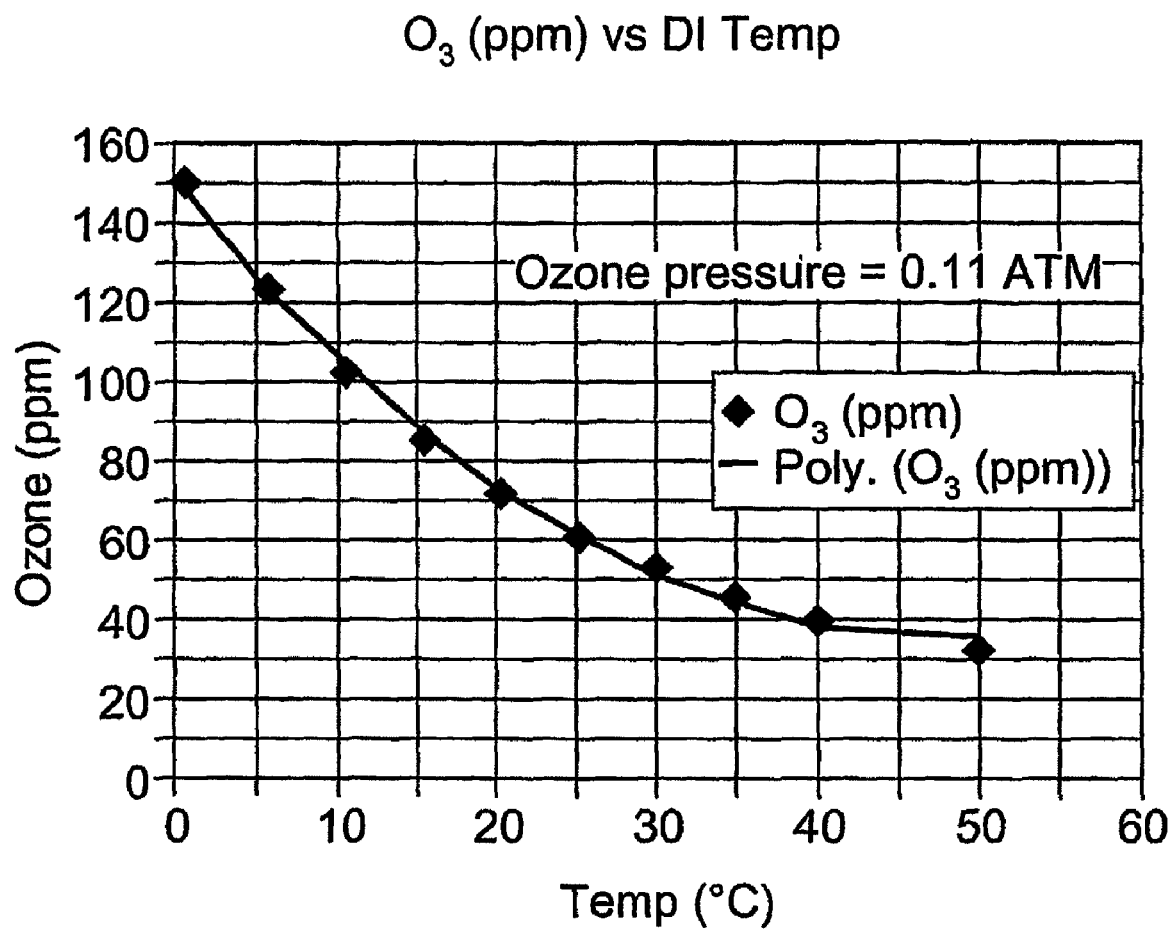
FIG. 12 illustrates the relationship between ozonation and temperature.

The values of Henry's constant are available in literature [see, Handbook of Chemical Engineering, #2-125; and B. Parekh, "Ozone in Wet Cleans (Part I: Technology), Applications Note MAL 126, Mykrolis Corporation, Bedford, Mass. USA]. From Equations 1 and 2 one can calculate the equilibrium solubility of ozone as a function of temperature for a given ozone generator condition. As an example, FIG. 12 shows the plot of equilibrium ozone solubility (ppm) in water as a function of temperature at ozone gas side pressure of 0.11 atm. This is the maximum concentration achievable at a given temperature. Decreasing the solution pH increases ozone solubility; however below pH 2, HCl lowers ozone solubility as Cl-ion reacts with ozone.

Example 5

The effect of a water side condition on performance investigated in this example was the effect of flow rate on device output.

Figure 13:
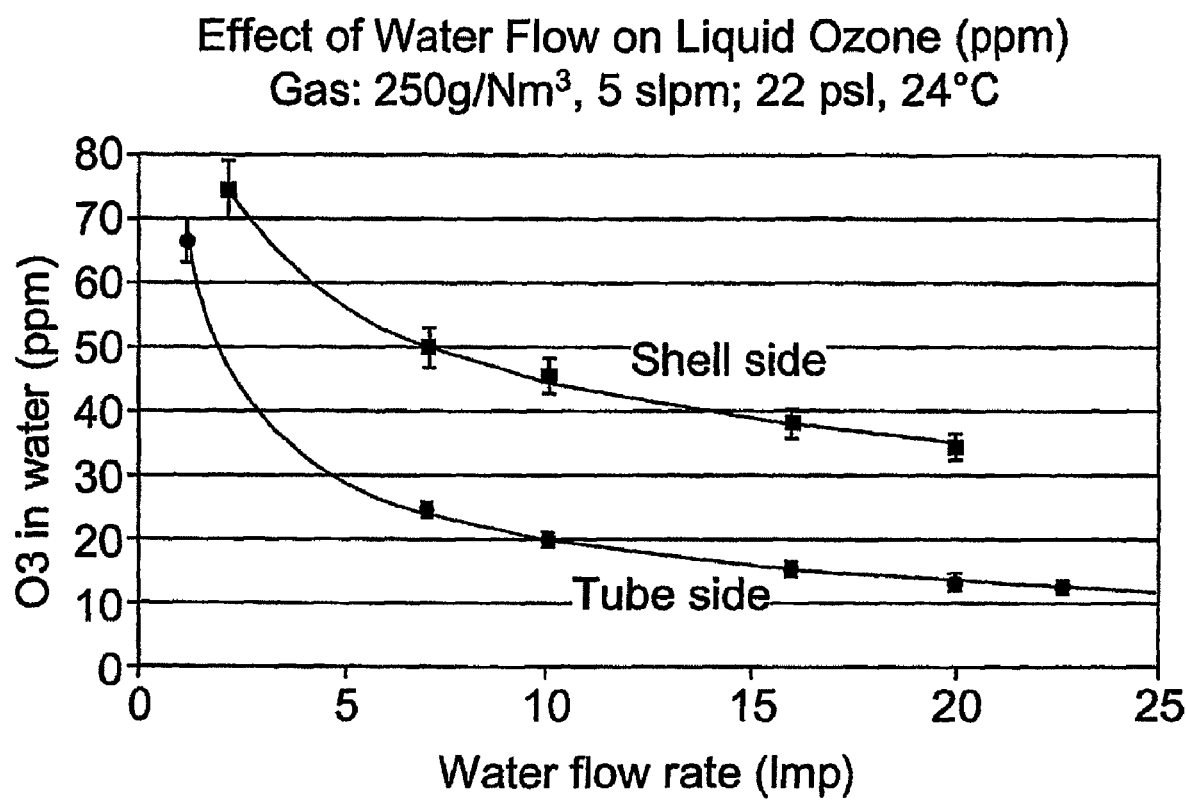
FIG. 13 illustrates the effect of water flow rate on ozonation.

The device output will approach the equilibrium value (predicted by FIG. 12) at very low water flow rates and decrease with an increase in water flow rate. This is because the contact time for ozone transfer into DI water is greater at low DI water flow rates. Plots in FIG. 13 show ozone output as a function of water flow rate for shell side and tube side contactors.

Example 6

Figure 14:
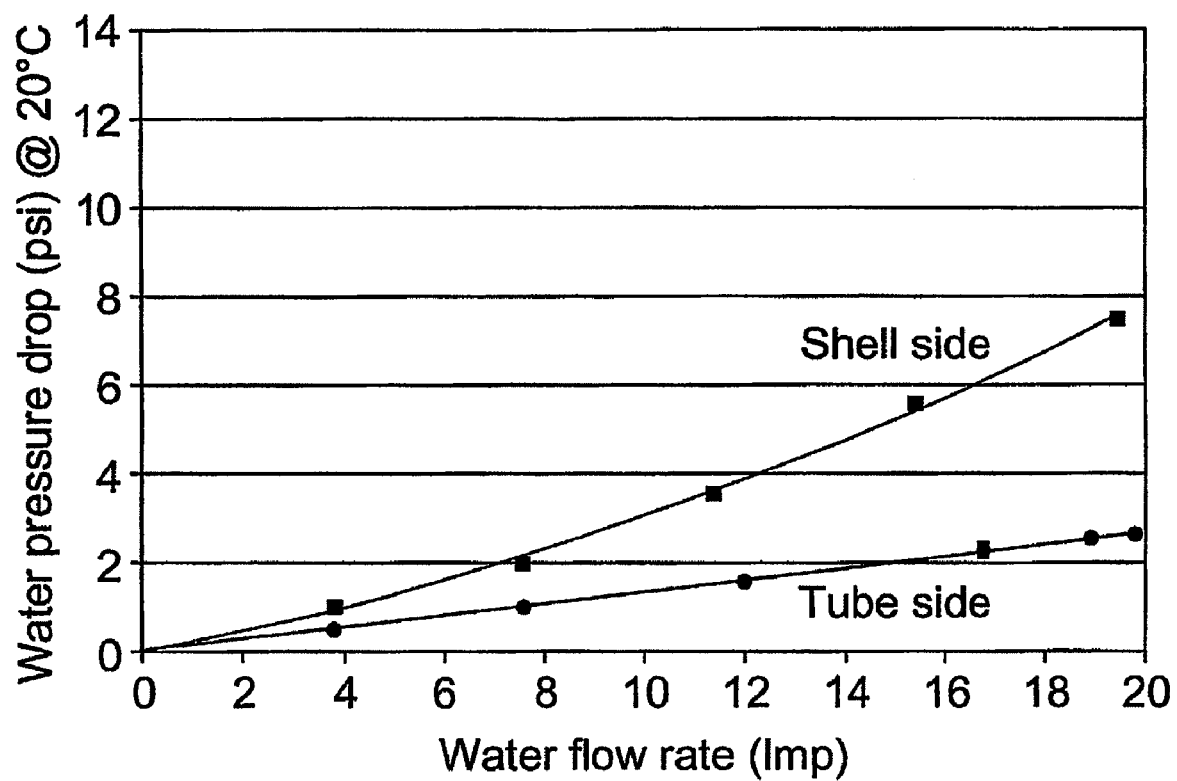
FIG. 14 illustrates the effect of water flow rate vs. pressure drop.

The effect of a water side condition on performance investigated in this example was DI water flow rate versus pressure drop. The pressure drop versus water flow rate data are plotted in FIG. 14.

Example 7

The shell side ozonator of the present invention should improve the cost of ownership for an ozone based wet cleans tool because of (1) its high productivity (ozone output per device volume), (2) smaller footprint, rapid start-up (faster mass transfer rate), and (3) ease of installation (only four tube connections). Because of its simple compact design and efficient performance, the module is appropriate for both a once-through (single pass) mode and in recirculation mode operations. It is easily adaptable in the cleaning processes using immersion baths, single wafer spin processors and in batch spray processors. The hollow fiber ozonator may produce ozone-DI water for various applications including room temperature wafer cleanings (5 ppm to 50 ppm ozone) and low temperature photoresist stripping (5° C., 100 ppm ozone).

Figure 15:
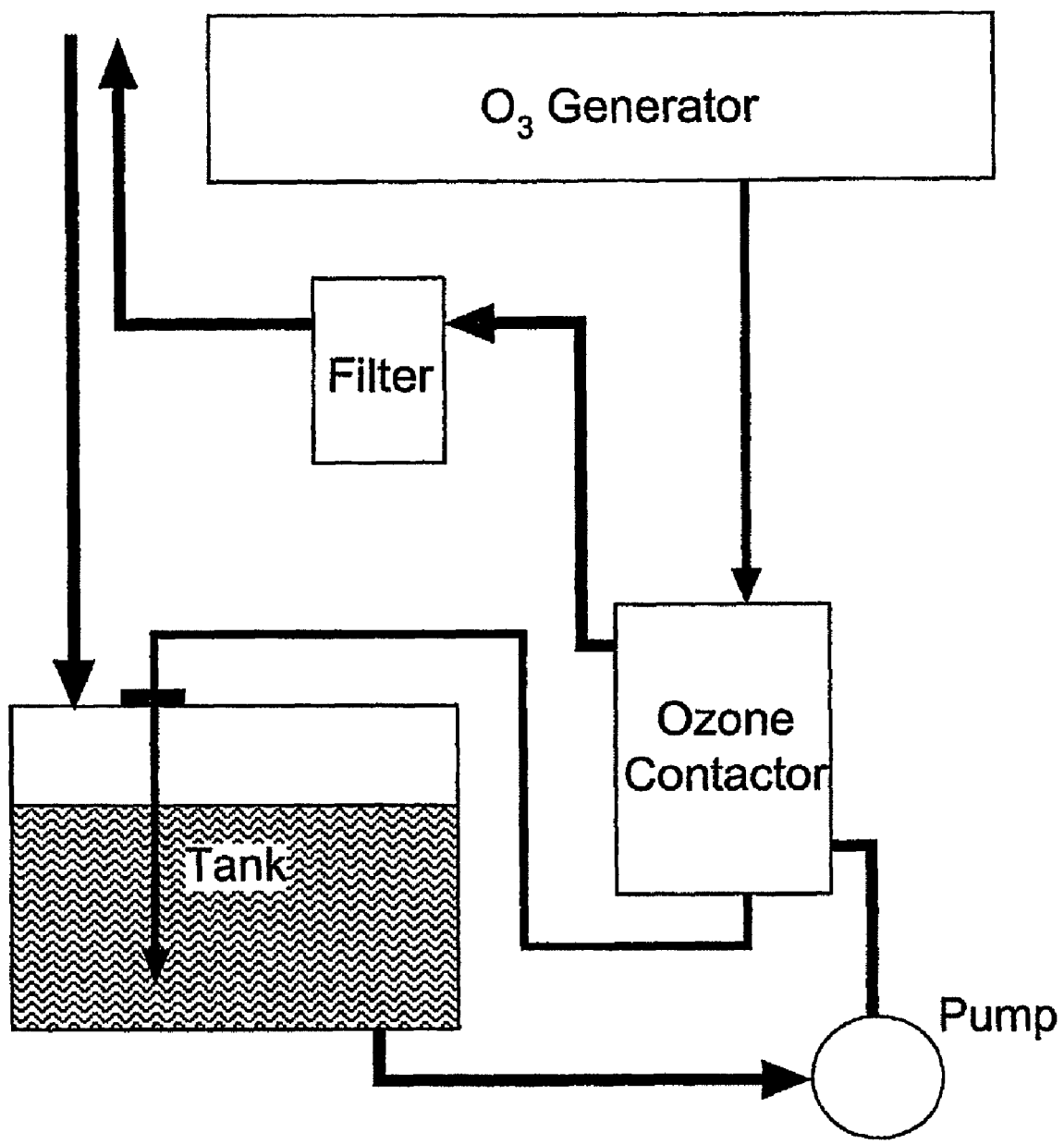
FIG. 15 is a schematic of an ozonation recirculating loop.

In some applications the ozonated water is produced at a central location and then recirculated for delivery to individual tool at point-of-use; in some designs make up amount ozone is added at the point-of-use. FIG. 15 shows schematics of an ozone-DI water recirculating loop.

The present invention allows for improvements in the start up time to reach the desired ozone concentration in cleaning tools and maintain the stability of the ozone concentration in a recirculating control loop over time for a bubble free DI water-Ozone application. The smaller size/footprint, shorter time to reach the desired ozone concentration, and the ease of controlling the device of the present invention in a narrow range of the ozone concentration allows the user better process control. An added advantage is the ability of the module to withstand high water pressure of about 2-2.5 bar, with intermittent pressure spikes of 3-4 bars.

What is claimed is:

1. A shell side liquid-gas phase contactor comprising:
   a bundle of a plurality of porous perfluorinated thermoplastic hollow fiber membranes comprising a polymer selected from the group consisting of poly (tetrafluoroethylene-co-perfluoro (alkylvinylether)), tetrafluoroethylene-co-hexafluoropropylene, and blends of these,
   the hollow fibers having a first end and a second end, an outer surface and an inner surface;
   the hollow fiber membranes selected from the group consisting of:
      hollow fiber membranes having a porous skinned inner surface, a porous outer surface, and a porous support structure between;
      hollow fiber membranes having a porous skinned outer surface, a porous inner surface, and a porous support structure between; and
      hollow fiber membranes having a porous outer surface, a porous inner surface, and a porous support structure between,
   a perfluorinated thermoplastic housing wherein both ends of the hollow fibers are potted with a perfluorinated thermoplastic seal forming a unitary end structure with the housing where the fiber ends are open to fluid flow,
   the housing having an inner wall and an outer wall wherein the inner wall of the housing and the outer surface of the hollow fiber membranes define a fluid flow volume,
   the housing having a gas inlet to supply a gas to the first end of the hollow fiber lumen and a gas outlet for removal of gas from the second end of the hollow fibers,
   the housing having a liquid inlet fitting to supply a liquid to be contacted with the outer surface of the hollow fiber membranes and a liquid outlet fitting to remove the liquid contacted with the outer surface of the fibers in the housing, said liquid inlet fitting and said liquid outlet fitting are ½ inch to 1 inch and carry water at flow rates up to 10 gallons per minute; and
   spacer means for reducing pressure drop within said housing, said spacer means located at an unpotted portion of the hollow fibers adjacent the liquid inlet spreads said hollow fiber membranes, said contactor has packing density of said hollow fiber membranes whereby a shell side liquid pressure drop of said contactor is between about 2 psig and about 15 psig at a water flow rate of 5 gpm at 25° C.

2. The contactor of claim 1 having hollow fiber membranes with an outer diameter in the range of from about 300 microns to about 1500 microns.

3. The contactor of claim 1 wherein the porous skinned surface pores have a diameter in the range of 0.001 micron to about 0.05 micron.

4. A method of using the contactor of claim 1 to dissolve a gas in a liquid comprising: flowing an ozone containing gas through the hollow fiber lumen and contacting an aqueous liquid with the outer surface of the hollow fiber membranes.

5. The contactor of claim 1, wherein the hollow fibers are twisted.

6. The contactor of claim 1 wherein the spacer means spreads said hollow fiber membranes (pg. 19, first through third full paragraphs) and creates gaps in a bundle of said hollow fiber membranes in said contactor.

7. The contactor of claim 1 wherein ozone gas in the lumens of said hollow fiber membranes at a concentration of 250 g/Nm$^3$ and 22 psig pressure and a gas flow rate of 3 slpm is transferred with an efficiency of over 60% into water flowing at 20 lpm at 25° C. on the outer surface of said hollow fiber membranes.

8. The contactor of claim 1 wherein ozone gas in the lumens of said hollow fiber membranes at a concentration of 250 g/Nm$^3$ and 22 psig pressure and a gas flow rate of 5 slpm is transferred into water flowing at 5 gpm at 25° C. on the outer surface of said hollow fiber membranes with an efficiency of about 100%, or more than 100%, compared to a tube-side efficiency of the said contactor operating under tube-side mass transfer.

9. The contactor of claim 1, wherein the hollow fibers are twisted.

10. A shell side liquid-gas phase contactor made from a perfluorinated thermoplastic polymer for contacting a liquid with a gas said contactor comprising:
   a bundle of porous perfluorinated thermoplastic hollow fibers having a first end and a second end, the hollow fibers formed of a polymer selected from the group consisting of poly (tetrafluoroethylene-co-perfluoro (alkylvinylether)), tetrafluoroethylene-co-hexafluoropropylene, and blends of these polymers,
   the hollow fibers having an outer surface and an inner surface,
   a perfluorinated thermoplastic housing wherein each end of the hollow fiber are potted to form a liquid tight seal forming a unitary end structure with the surrounding housing wherein the hollow fiber ends are open;

the housing having an inner wall and an outer wall wherein the inner wall of the housing and the hollow fiber outer surface defines a liquid flow volume, the housing having a gas inlet to supply a gas to the first end of the hollow fibers and a gas outlet to remove gas from the second end of the hollow fibers;

the housing has a spacer that reduces the pressure drop within said housing, said spacer, located at an unpotted portion of the hollow fibers adjacent the liquid inlet, spreads said hollow fibers, said contactor has packing density of said hollow fibers whereby a shell side liquid pressure drop of said contactor is between about 2 psig and about 15 psig at a water flow rate of 5 gpm at 25° C.;

the housing has a liquid inlet fitting to supply a liquid to be contacted with the outer surface of the hollow fibers and a liquid outlet fitting to remove the contacted liquid from the housing, said inlet fitting and said outlet fitting are ½ inch to 1 inch and carry water at flow rates up to 10 gallons per minute.

11. The contactor of claim 10 wherein the porous perfluorinated thermoplastic hollow fibers are unskinned.

12. A method of using the contactor of claim 10 comprising: flowing in the hollow fibers a gas that contains ozone and contacting the outer hollow fiber surface with an aqueous liquid.

13. The method of claim 12 wherein the hollow fibers are unskinned.

14. The contactor of claim 10 wherein ozone gas in the lumens of said hollow fibers at a concentration of 250 g/Nm$^3$ and 22 psig pressure and a gas flow rate of 3 slpm is transferred with an efficiency of over 60% into water flowing at 20 lpm at 25° C. on the outer surface of said hollow fibers.

15. The contactor of claim 10 wherein ozone gas in the lumens of said hollow fibers at a concentration of 250 g/Nm$^3$ and 22 psig pressure and a gas flow rate of 5 slpm is transferred into water flowing at 5 gpm at 25° C. on the outer surface of said hollow fibers with an efficiency of about 100%, or more than 100%, compared to a tube-side efficiency of the said contactor operating under tube-side mass transfer.

16. The contactor of claim 10, wherein the hollow fibers are twisted.

17. The contactor of claim 10 wherein an inside of the liquid inlet fitting is reduced, thereby creating a jetting of water into the bundle of said hollow fibers.

18. The contactor of claim 10 wherein the spacer spreads said hollow fibers and creates gaps in the bundle of said hollow fibers in said contactor.

19. The contactor of claim 17 wherein the liquid inlet fitting is reduced with an insert.

\* \* \* \* \*